United States Patent [19]

Valyi

[11] Patent Number: 5,579,937
[45] Date of Patent: *Dec. 3, 1996

[54] BLOW MOLDED PLASTIC CONTAINERS INCLUDING A HANDGRIP AND METHOD FOR OBTAINING SAME

[75] Inventor: Emery I. Valyi, Katonah, N.Y.

[73] Assignee: Pepsico, Inc., Purchase, N.Y.

[ * ] Notice: The term of this patent shall not extend beyond the expiration date of Pat. No. 5,398,828.

[21] Appl. No.: 242,426

[22] Filed: May 13, 1994

Related U.S. Application Data

[63] Continuation-in-part of Ser. No. 77,271, Jun. 17, 1993, Pat. No. 5,398,828, which is a continuation-in-part of Ser. No. 55,663, Apr. 29, 1993, abandoned.

[51] Int. Cl.$^6$ .............................. B65D 1/04; B65D 23/10; B29C 49/12; B29D 24/00
[52] U.S. Cl. .............................. 215/384; 215/6; 220/771; 264/524; 264/537
[58] Field of Search .............................. 215/6, 383, 384; 220/771; 264/523, 537, 524

[56] References Cited

U.S. PATENT DOCUMENTS

| | | | |
|---|---|---|---|
| 3,232,495 | 2/1966 | Schneider | 215/384 X |
| 3,347,401 | 10/1967 | Nataf | 215/384 X |
| 4,603,831 | 8/1986 | Krishnakumar et al. | 264/523 X |
| 4,804,097 | 2/1989 | Alberghini et al. | 215/384 |
| 4,993,565 | 2/1991 | Ota et al. | 215/384 |
| 5,141,120 | 8/1992 | Brown et al. | 215/384 X |
| 5,165,557 | 11/1992 | Ota et al. | 220/771 X |
| 5,269,441 | 12/1993 | O'Meara | 215/6 X |
| 5,398,828 | 3/1995 | Valyi | 215/6 X |

FOREIGN PATENT DOCUMENTS

| | | | |
|---|---|---|---|
| 2720448 | 7/1978 | Germany | 264/523 |
| 4738064 | 9/1972 | Japan | 264/537 |
| 3236932 | 10/1991 | Japan | 264/537 |
| 5318563 | 12/1993 | Japan | 264/537 |
| 9005674 | 5/1990 | WIPO | 215/1 C |

Primary Examiner—Sue A. Weaver
Attorney, Agent, or Firm—Bachman & LaPointe, P.C.

[57] ABSTRACT

A blow molded plastic container including a supporting member in the hollow space of the container extending completely across the hollow space and integral with the inside wall face of the body portion of the container at two spaced locations thereof to support the inside wall face. The body portion defines regions that comprise at least two adjoining lobes which form a handgrip. The method injection molds a preform containing an inner wall, blow molds the preform into the shape of a precursor having adjoining lobes separated by depressions, removes the precursor from the blow mold, and applies internal pressure into the precursor to form the precursor into its final shape including lobes.

11 Claims, 2 Drawing Sheets

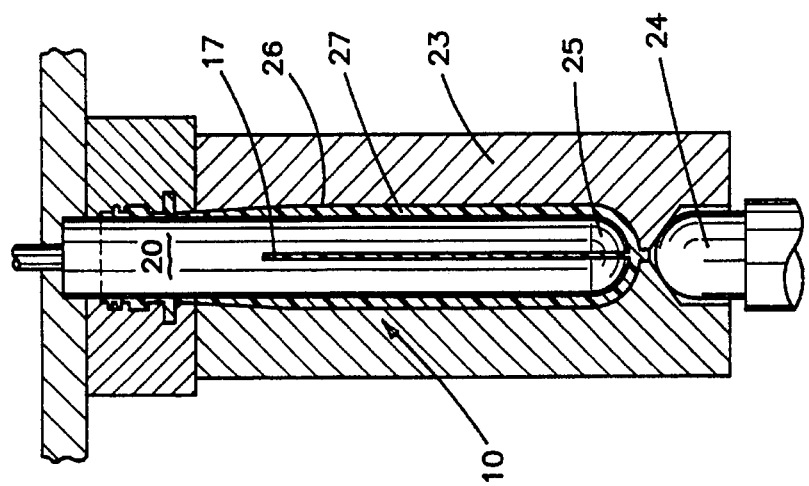
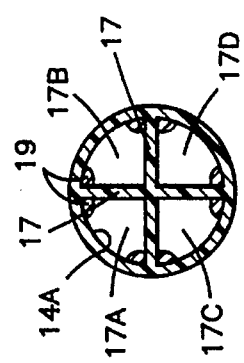
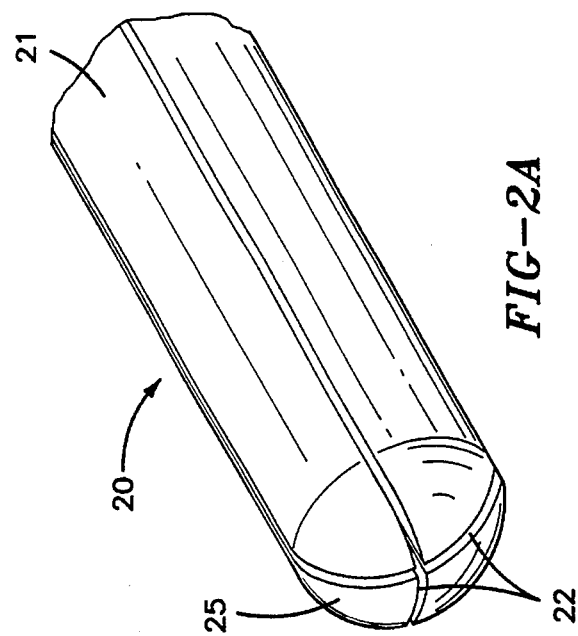
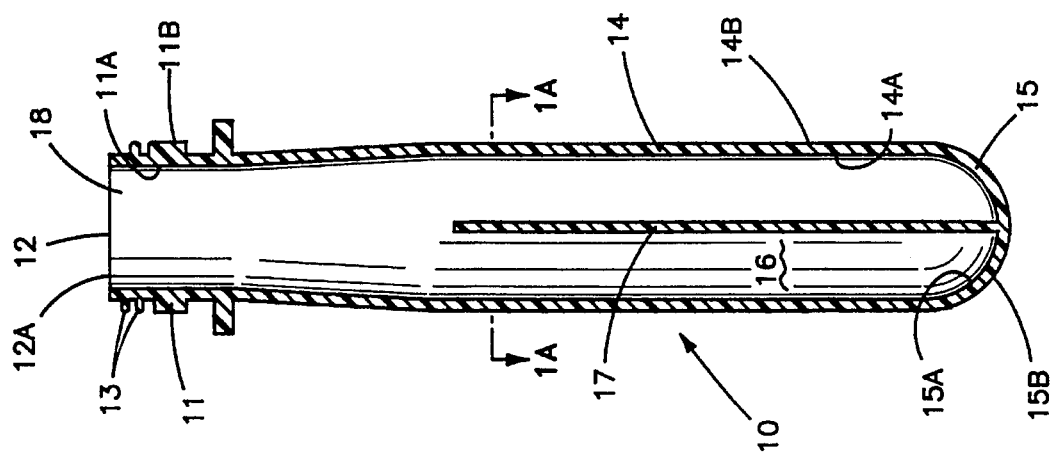

BLOW MOLDED PLASTIC CONTAINERS INCLUDING A HANDGRIP AND METHOD FOR OBTAINING SAME

CROSS-REFERENCE TO RELATED APPLICATIONS

This application is a Continuation-In-Part of U.S. patent application Ser. No. 08/077,271, filed Jun. 17, 1993, U.S. Pat. No. 5,398,828, which is a Continuation-In-Part of U.S. patent application Ser. No. 08/055,663, filed Apr. 29, 1993, now abandoned.

BACKGROUND OF THE INVENTION

The present invention relates to plastic containers especially for retention of fluids under pressure, as for carbonated beverages or the like, and to the manufacture thereof. These containers are usually prepared from a preform which may be injection or extrusion molded, followed by blow molding the preform into a suitably shaped container using a blow mold having the desired shape. Typical thermoplastic materials are polyethylene terephthalate (PET), polyolefins, etc., although others can be used.

The container configuration generally includes a neck portion with a cap retaining means, a shoulder portion depending therefrom, a side wall or main body portion depending from the shoulder portion and a bottom portion joined to the side wall and depending therefrom.

For the convenience and economy they represent, the public calls for large size containers, as for example, the two liter PET bottles widely used for carbonated beverages and one gallon milk bottles. Indeed, even larger containers would be desirable. However, these containers are awkward, especially for small children unless provided with means to handle them conveniently.

Accordingly, handles or handgrips are used, made in various ways, depending primarily on the material of the bottle and the process best suited to convert it into the desired shape. In polyethylene (PE) bottles made by extrusion blow molding, a hollow handle may be made by action of the same mold that shapes the extruded preform into the bottle itself, as is well known. The prerequisites for this technique are an extruded preform and a plastic, such as PE, that may be readily pressure welded. Bottles made of PET from injection molded preforms do not have hollow, integral handles, because it is well-nigh impossible to weld PET into a closed handle by the above technique.

The art shows ways to provide handles for PET bottles, but none of them are integral with the body of the bottle, i.e., made from the preform used to blow the bottle itself. Instead, separately made handles are mechanically attached, or molded onto the finished body in a separate molding step, e.g., as shown in U.S. Pat. No. 4,727,997 to Y. Nakamura. This is an expensive and often unreliable procedure that is commercially unsuccessful.

A handgrip may be used as a substitute for a handle, the difference between the two being that, in grasping a handle, at least one finger of the user's hand is inserted into a hole formed by a loop attached to the bottle, or integral therewith while the handgrip, or simply grip, is formed by indentations in the bottle wall designed to permit grasping the grip between the thumb and forefingers.

Such a grip may be readily produced as an integral part of the bottle from an otherwise normal preform in a mold that has a corresponding cavity as part of the one forming the rest of the bottle wall. PET bottles with such a grip are used commercially, as for example to package spirits, wine and other liquids in large sizes, usually over 2 liters.

The same design cannot be used for bottles subjected to internal pressure, as in the case of carbonated beverages, because in a thin-walled, elastic, cylindrical, hollow body subject to internal pressure any shape, including an indentation will assume that of a sphere or cylinder, i.e., evert, obliterating said indentations or other deviation from a substantially circular cross-section.

The purpose of this invention is to provide an economical and aesthetically pleasing bottle made of PET, or other plastics exhibiting comparable molding characteristics, such as polycarbonate, polystyrene, etc., which bottle has a grip as part of its side-wall that will evert in a predetermined fashion under internal pressure and thereby provide its usefulness.

In the past, it was attempted to accomplish this purpose by rendering the wall rigid at the indentations, by providing rib-like reinforcements. U.S. Pat. No. 4,890,752 to A. Ota et al. may serve as an example. The disadvantage is due mostly to excessive wall thickness and corresponding materials' cost of the design if it is to preclude eversion into a shape that is hard to grasp in the hand, particularly at pressures typical of bottled soft-drinks and carbonated water.

Accordingly, it is a principal object of the present invention to provide a blow molded plastic container for carbonated beverages having an improved configuration.

It is a still further object of the present invention to provide a container as aforesaid including a strengthened handgrip portion.

It is a still further object of the present invention to provide a container as aforesaid wherein the strengthened handgrip portion retains its efficacy when the container is filled with a carbonated beverage.

Further objects and advantages of the present invention will appear hereinbelow.

SUMMARY OF THE INVENTION

In accordance with the present invention, the foregoing objects and advantages may be readily obtained.

The present invention provides an improved blow molded plastic container for carbonated beverages including a strengthened handgrip portion which retains its efficacy under pressure, as upon filling the container with a carbonated beverage.

The blow molded plastic container comprises: a neck portion defining an opening, a bottom portion and a body portion interconnecting said neck and bottom portions; wherein said neck, body and bottom portions define a hollow space closed at the bottom portion and open at the neck portion; said neck, body and bottom portions having an inside wall face and an outside wall face; at least one supporting member in the hollow space extending completely across the hollow space and integral with the inside wall face of the body portion at two spaced locations thereof to support said inside wall face; wherein the body portion defines regions that comprise at least two adjoining lobes and with said lobes having two spaced depressions and a wall portion extending from one spaced depression to the other to form a handgrip, with at least one supporting member in the hollow space extending from one depression to the other; and wherein said wall portion of at least one of said lobes is blown in a mold to include segments releasable from said mold and deformed under internal pressure into the configuration of said handgrip, as when said container is filled with a carbonated beverage. Preferably, one of said lobes includes two segments joined together and extending outwardly from said depressions and having a taper of at least one degree, said segments bulging outwardly to form arcuate segments under internal pressure.

In a preferred embodiment of the present invention, the body portion defines two adjoining lobes of unequal size. Also, in a preferred embodiment, the supporting member and the handgrip is limited in extent to the body portion. In a still further embodiment, the body portion includes an axially inwardly directed part having an inside wall face thereof, wherein the supporting member is also integral with the inwardly directed part inside wall face to support same. If desired, a plurality of said support members may be provided in the hollow space.

The container of the present invention provides numerous advantages. Firstly, a blow molded plastic container is provided with a supporting member inside the container providing support therefor. The container includes handgrips which obtain their efficacy when the container is filled with carbonated beverages. The container of the present invention with supported handgrips is convenient and easy to prepare by commercial methods.

The present invention also provides a blow molded plastic container, which comprises injection molding a preform containing an inner wall within its body portion; blow molding the preform in a blow mold into the shape of a precursor comprising at least two adjoining lobes separated by depressions, wherein the inner wall extends from one depression to the other, and wherein the lobes clear the parting surfaces of the blow mold; and removing the precursor from the blow mold and applying internal pressure therein to deform at least one of said lobes to provide a curved handgrip therefrom.

In addition, the present invention also provides a method which comprises producing a plastic container from a preform having a body portion and indentations on the wall thereof to form lobes, with the wall thickness of the indentations being substantially the same as that of said lobes; including the step of producing said preform to include thickened regions therein juxtaposed the portions of the blow mold in which the indentations are formed, and blow molding said preform to form said container.

Further advantages of the present invention will appear hereinbelow.

BRIEF DESCRIPTION OF THE DRAWINGS

The foregoing will be more readily apparent when considered in connection with the following illustrative drawings wherein:

FIG. 1 is a side-sectional view of a preform for preparing a container of the present invention;

FIG. 1A is a sectional view taken along lines 1A—1A of FIG. 1;

FIG. 2A is a partial perspective view of a core for forming the preform of FIG. 1;

FIG. 2B is a sectional view of a core-injection mold assembly for forming the preform of FIG. 1;

DETAILED DESCRIPTION OF PREFERRED EMBODIMENTS

Figure 3:
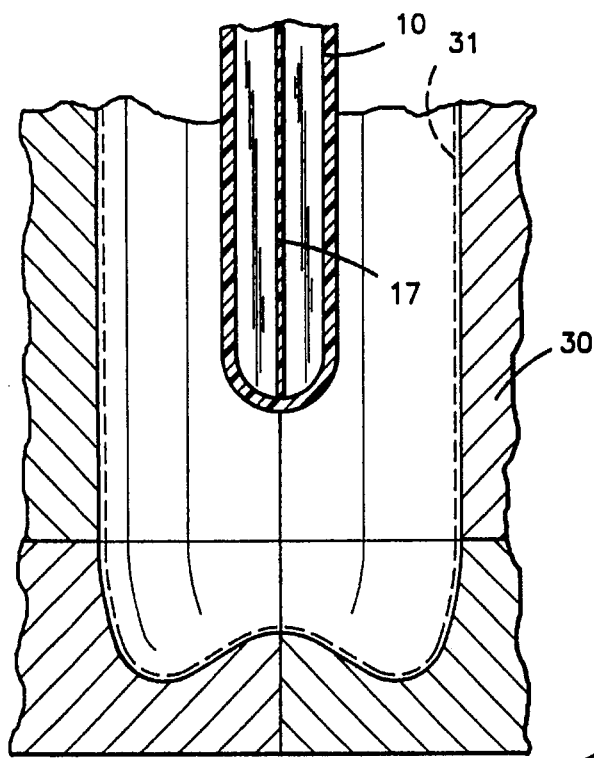
FIG. 3 is a partial sectional view taken through a blow mold for forming a container of the present invention from a preform similar to the preform of FIG. 1.

In accordance with the present invention, the external configuration of the container of the present invention is made to exhibit depressions and lobes between the depressions that serve to facilitate gripping the bottle while said bottle is under internal pressure. This is particularly desirable for a bottle or container with a large circumference and makes the pressurized container easy to handle when full or partially full. An internal supporting member or members are provided adjacent the depressions to support same against the internal pressure to prevent eversion thereof while said pressure shapes at least one of said lobes to provide a firm handgrip portion.

The preform for forming these containers may be prepared by injection molding and includes at least one internal wall extending completely across the inside of the preform in the location which will correspond to that of the internal supporting member in the final blow molded and pressurized container.

Referring to FIG. 1, a plastic parison or preform 10 is formed by injection molding from a synthetic resin which desirably can be biaxially oriented as for example polyethylene terephthalate. The preform 10 has a neck portion 11 defining an opening 12 and it may be provided with external threads 13 to serve as the site for attachment of a cap or closure means on the finished, blow molded plastic container. The preform 10 has a body portion 14 depending from the neck portion 11 and an integral bottom portion 15 depending from the body portion. The body portion in FIG. 1 is generally tubular, although one can of course deviate from a tubular structure. Neck portion 11 has an inside wall face 11A and an outside wall face 11B, tubular body portion 14 has an inside wall face 14A and an outside wall face 14B, and bottom portion 15 has an inside wall face 15A and an outside wall face 15B. Body portion 14 defines hollow space 16 within preform 10, wherein the hollow space 16 is closed at the bottom portion 15 and open at neck opening 12. Bottom portion 15 may have any desired or convenient shape depending upon desired processing and final container characteristics, such as for example the rounded semi-circular shape shown in FIG. 1, or for example a flat or even slightly inwardly directed bottom shape.

Preform 10 includes at least one and possibly two or more internal walls 17, such as the two walls shown in FIG. 1A. The internal walls 17 extend completely across hollow space 16 and from the bottom portion 15, into tubular body portion 14 ending within body portion 14. As shown in FIG. 1A, four separate chambers 17A, 17B, 17C and 17D are formed by internal walls 17, although of course the chambers communicate with each other above wall 17. Alternatively, internal walls 17 may be limited to that region of preform 10 that will subsequently form a handgrip as will be described hereinbelow. As can be clearly seen in FIGS. 1 and 1A, the internal walls 17 are attached to inside wall face 14A. The preform may be made of transparent PET so that the internal walls are readily visible.

The method of forming preform 10 by injection molding is shown in FIGS. 2A and 2B whereby injection molding core 20 includes external wall 21 in a generally cylindrical shape and including slots 22 corresponding to the desired internal partition walls in the preform. Thus, core 20 is placed in injection mold 23 in the conventional manner in alignment with injection nozzle 24 seated in injection mold 23 adjacent the bottom 25 of injection core 20. Core 20 is seated in injection mold 23 so that a space 26 appears between core 20 and injection mold 23 and molten plastic 27 is injected to fill space 26 via injection nozzle 24. Molten plastic 27 will also travel into slots 22 in the core 20 to form the internal walls 17. The injection mold and core assembly is then opened, and the preform 10 removed in the conventional manner.

While at a temperature appropriate for blow molding, the warm preform 10 is then placed in a blow mold 30 as shown in FIG. 3 and a hollow article to serve as a precursor of the container of the present invention is formed therefrom by conventional blow molding or stretch blow molding.

The warm preform is placed in a blow mold having the configuration of the precursor of the desired container, as blow mold 30 in FIG. 3, while blowing compressed air thereinto so that the preform expands into shape 31 corresponding to said precursor, as shown in dashed lines in FIG. 3, to effect axial and circumferential elongation. This procedure may be carried out with or without a stretch rod or mandrel to effect axial extension. If such a rod is used, it should have as many prongs as there are preform chambers, with each bearing against the preform bottom within each chamber. The walls 17 will also expand to the extent permitted by blow mold 30. The particular blow mold shown in FIG. 3 has an internal configuration which allows the formation of a hollow plastic article being the precursor of container 40 shown in FIG. 4, a cross-section of the lobes of said precursor being shown in FIG. 5 in dotted lines. Mold 30 includes at least two adjoining lobes connected together by depressions, not shown in the section according to FIG. 3 but clearly shown in FIG. 5. If an axially, inwardly directed bottom part is desired, the blow mold will have this configuration. The preform will expand into the shape permitted by the blow mold, and the internal walls will also expand correspondingly.

In accordance with conventional procedure, mold 30 is parted as indicated by arrow 32 in FIG. 3 to release the blown precursor container.

Figure 5:
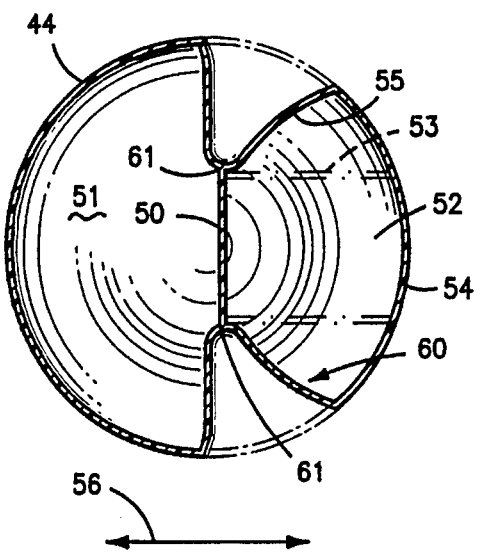
FIG. 5 is a cross-section view of the container of FIG. 4 taken along lines 5—5 of FIG. 4 showing the precursor of the container in the unfilled condition as well as the container filled with carbonated beverage.

As can be seen from FIG. 5, the circumference of the precursor is greater than that of a circle circumscribing same. Accordingly, the wall 14 of preform 10 in FIG. 1 is stretched excessively at the regions that form the depressions of the handgrip. In a preferred embodiment, the preform walls are provided with thickenings 19 shown in FIG. 1A that are juxtaposed said depressions during blow molding and thereby preclude excessive thinning of the walls of the depressions. It is particularly advantageous to include the thickened regions juxtaposed the portions of the blow mold in which the indentations are formed to preclude excessive thinning thereof and to provide a container wherein the wall thickness of the indentations are substantially the same as that of the walls, although core 20 in FIG. 2A does not reflect structure that provides the thickening 19 shown in FIG. 1A.

Thus, blow molded, plastic container 40 is formed having a neck portion 41 defining an opening 42, a bottom portion 43, a body portion 44 interconnecting the neck portion 41 and the bottom portion 43. Neck portion 41 is provided with external threads 45 corresponding to threads 13 on preform 10 for attachment of a closure. Bottom portion 43 may have an axially, inwardly directed generally conical base 46.

Container 40 also includes shoulder portion 47 connecting neck portion 41 and tubular body portion 44.

Container 40 is provided with at least one internal wall 50 which corresponds to the internal wall 17 of preform 10 and which extends completely across hollow space 51 within container 40 and from the bottom portion 43 to the body portion 44, ending in the body portion.

As can be readily seen from FIGS. 3 and 5, the internal walls are integral with the container. The internal walls or walls may extend all the way to the bottom of the container as shown in FIG. 3 or may start and end in the body portion as shown in FIG. 4.

Referring to FIG. 5, body portion 44 contains adjoining arcuate lobes 60 connected together by depressed regions or depressions 61, particularly suitable for a handgrip in a large sized container. Naturally, alternate shapes can be provided. Supporting members 50 in hollow space 51 connect the depressions to maintain their spacing and to provide support therefor. The supported handgrips thus provided will not evert as the bottle is pressurized. Since the supporting walls are integral with the inside wall faces of the body portion and are adjacent the depressions, they will provide a firm support for same which will for example prevent eversion of the walls. Therefore, the handgrip will remain firm and stable whether the container is full or partly full. As can be seen from FIG. 4, the internal wall desirably ends within the body portion near the end of the handgrip. Accordingly, the lobes and depressions which form the handgrip preferably end in the body portion and indeed, as shown in FIG. 4, advantageously start and end in the body portion to form a discrete closed handgrip. This is shown in a representative embodiment of FIG. 4 wherein container 40 has discrete handgrips formed by depressions 61 and lobes 60. Supporting member 50 is provided adjacent and supporting the depressions as discussed above. Of course, if desired, the handgrip may extend all the way to the bottom portion or may extend well into the shoulder portion.

Figure 4:
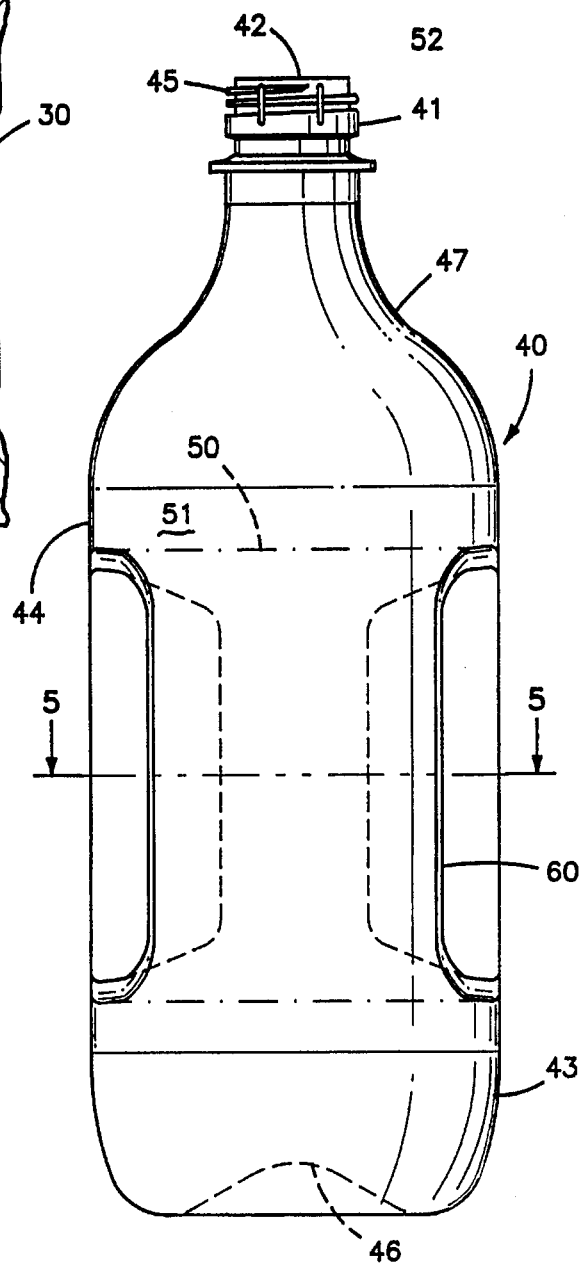
FIG. 4 is an elevational view of a container of the present invention.

FIGS. 4 and 5 show a preferred embodiment of the container 40 of the present invention. FIG. 5 shows precursor lobe 52, as produced in the blow mold, see FIG. 5 where the boundary of precursor lobe 52 is shown in dashed lines, with internal supporting member 50 connecting two adjoining indentations or depressions 61 at the base thereof to preclude spreading of the lobe at the location of the junction between supporting member 50 and indentations 61. In the precursor of container 40, precursor lobe 52 includes essentially parallel segments 53 with substantially straight walls or a slight outward taper of 10 or more shown in dashed lines, joined together by arcuate segment 54. Segments 53 are deformed to become arcuate segments 55 which define the boundary of smaller lobe 60 when the precursor container is pressurized, e.g., by being filled with carbonated beverage. Thus, as blow-molded lobe 52 has substantially parallel sides which are necessary for a blow mold that is relatively inexpensive and easy to operate because the lobe is not undercut in the direction of the opening stroke of the mold as indicated by arrow 56. It can be readily seen that the lobe 52 (the boundary of which is indicated by the dashed line segments 53) is not convenient to grasp with the hand or fingers as a handgrip. By contrast, the lobe 60 (the boundary of which is indicated by segments 55) is particularly convenient to use as a handgrip since not only is the base of indentations 61 restrained by supporting member 50, but also because the sides of the as molded lobe 52 deform to form arcuate segments which readily permit the fingers or hand to curve around the handgrip whereby a secure grip is obtained between thumb and several of the other fingers.

Another favorable aspect of the containers of FIGS. 4 and 5 is the fact that actually two sizes of handgrip exist in the same bottle. Thus, the smaller lobe 60 is considered to be one grip and the remainder of the bottle is considered to be another or bigger handgrip which will be convenient to grasp by a large hand. Suitable placement of the supporting member at or off the centerline of the container permits proportioning of the lobes, for example, one to accommodate the hand of an adult and the other to accommodate the hand of a child. Further, the two surfaces presented by these lobes provide suitable placement of two separate labels, one the prominent label to identify the brand and merit of the content, and the other to carry the information mandated by law to be shown on beverage containers. This offers an improved opportunity to emphasize the sales message as the bottle is displayed on the store shelf.

A preferred configuration of the handgrip of the present invention is to provide that the handgrip accommodates a size which approximates the width of a hand, as clearly shown in FIG. 5. Thus, the handgrip is preferably placed along the length of the bottle in the central region thereof as clearly shown in FIG. 4. Since the strut or supporting member 50 is needed only over the length of the handgrip, it may desirably be limited in extent thereto. Naturally, it may be extended downwardly to intersect the base of the container as shown in FIG. 3 which represents a convenient manufacturing procedure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A blow molded plastic container which comprises: a neck portion defining an opening, a bottom portion and a body portion interconnecting the neck and bottom portions; wherein said neck, body and bottom portions define a hollow space closed at the bottom portion and open at the neck portion; said neck, body and bottom portions having an inside wall face and an outside wall face; at least one supporting member within the hollow space extending completely across the hollow space and integral with the inside wall face of the body portion at two spaced locations thereof to support said inside wall face; wherein the body portion defines regions that comprise at least two adjoining lobes, and with said lobes having two spaced depressions and a wall portion extending from one spaced depression to the other to form a wall portion having a shape of a handgrip, wherein at least one of said at least one supporting member in the hollow space extends from one of said spaced depressions to the other to support said spaced depressions, and wherein the spaced depressions have a base portion and the supporting member extends within the hollow space from said depression base of one of said spaced depressions to said depression base of the other of said spaced depressions; and wherein said wall portion of at least one of said lobes is blown in a mold to include segments releasable from said mold and deformed under internal pressure into the configuration of said handgrip.

2. A container according to claim 1 wherein one of said lobes is a smaller lobe.

3. A container according to claim 2 wherein the smaller lobe includes said wall portion extending outwardly from said depressions and having substantially straight walls, said wall portion bulging outwardly to form arcuate segments when the container is filled with a carbonated beverage.

4. A container according to claim 3 wherein the adjoining lobes are of unequal size, and with the smaller lobe having said two spaced depressions with said wall portion extending from one spaced depression to the other to form a shape of said handgrip.

5. A container according to claim 4 wherein the handgrip is limited in extent to the body portion.

6. A container according to claim 5 wherein the supporting member which extends from one spaced depression to the other is limited in extent to the body portion and to the handgrip.

7. A container according to claim 1 wherein said handgrip has a curved configuration.

8. A method for providing a blow molded plastic container, which comprises:

injection molding a preform with a body portion having a hollow space therein and an inside wall face and containing an inner wall within its body portion extending completely across said hollow space and integral with the inside wall face at two spaced locations thereof to support the inside wall face;

blow molding the preform in a blow mold into the shape of a precursor comprising at least two adjoining lobes separated by two spaced depressions, wherein the inner wall extends from one depression to the other, and wherein the spaced depressions have a base portion and the supporting member extends within the hollow space from said depression base of one of said spaced depressions to said depression base of the other of said spaced depressions; and wherein the lobes clear the parting surfaces of the blow mold; and removing the precursor from the blow mold and applying internal pressure into said precursor to deform at least one of said lobes to provide a curved handgrip therefrom.

9. A method according to claim 8 including the step of injection molding a preform so that said inner wall is limited in extent to the body portion of the preform.

10. A method for providing a blow molded plastic container having lobes separated by depressions, which comprises:

injection molding a preform with a body portion having a hollow space therein and an inside wall face and containing an inner wall within its body portion extending completely across said hollow space and integral with the inside wall face at two spaced locations thereof to support the inside wall face;

blow molding the preform in a blow mold into the shape of a precursor comprising at least two adjoining lobes with wall portions thereof separated by two spaced depressions, wherein the inner wall extends from one depression to the other, and wherein the spaced depressions have a base portion and the supporting member extends within the hollow space from said depression base of one of said spaced depressions to said depression base of the other of said spaced depressions; and wherein the lobes clear the parting surfaces of the blow mold; and removing the precursor from the blow mold and applying internal pressure into said precursor to deform said precursor into the final shape of said container including at least one of said lobes to provide the wall portion of the deformed lobe with the shape of a handgrip.

11. A method according to claim 10, wherein internal pressure is applied to the precursor by filling same with carbonated beverage.

* * * * *